Aug. 9, 1955  J. P. SCONE  2,714,838
HOB SHIFTING MECHANISM
Filed March 16, 1951  4 Sheets-Sheet 1

INVENTOR.
John P. Scone
BY
Carlsen, Pitzner, Hubbard & Wolfe
ATTORNEYS

Aug. 9, 1955  J. P. SCONE  2,714,838
HOB SHIFTING MECHANISM
Filed March 16, 1951  4 Sheets-Sheet 2

INVENTOR.
John P. Scone
BY
ATTORNEYS

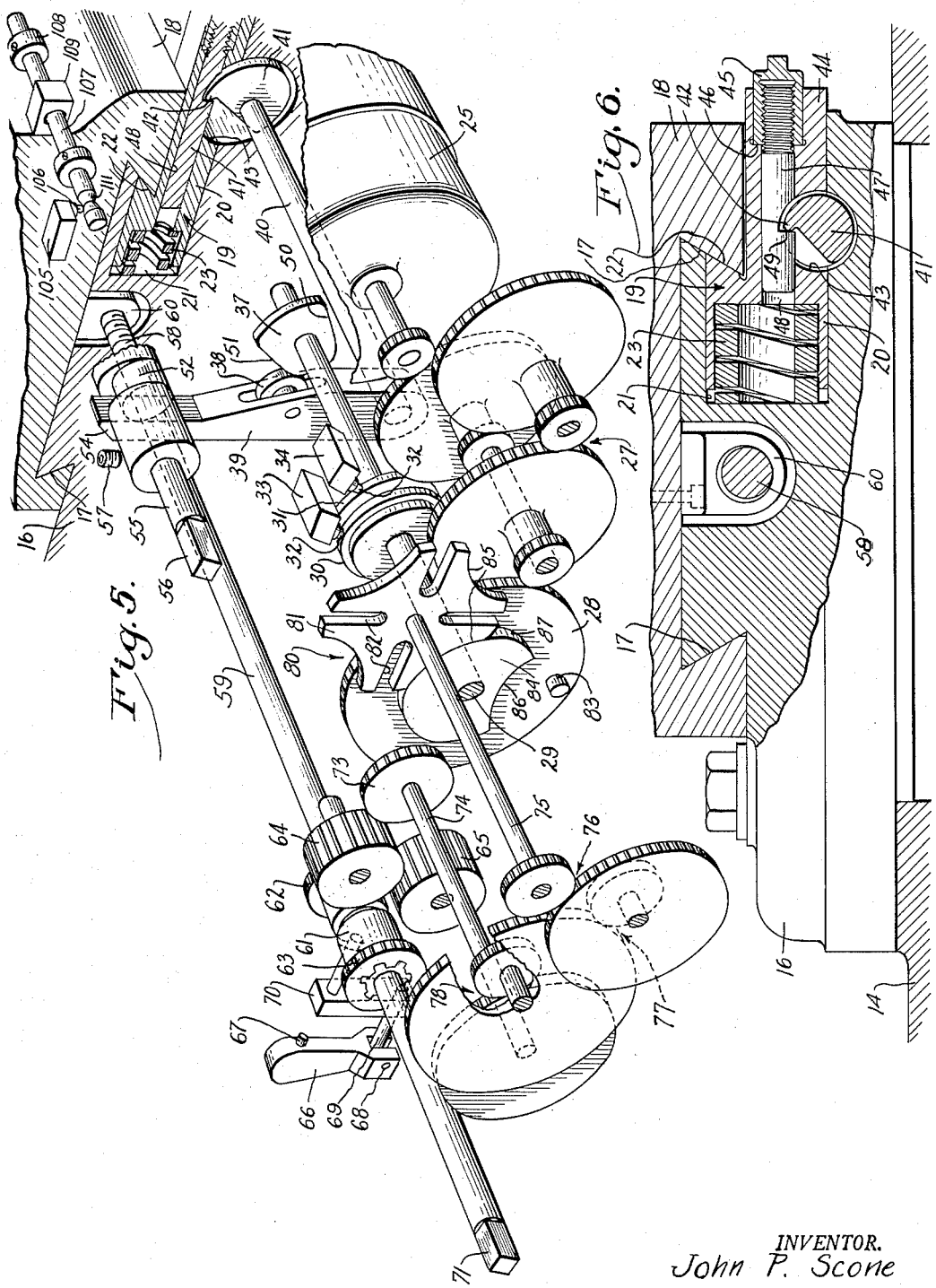

Aug. 9, 1955       J. P. SCONE       2,714,838
HOB SHIFTING MECHANISM
Filed March 16, 1951       4 Sheets-Sheet 4
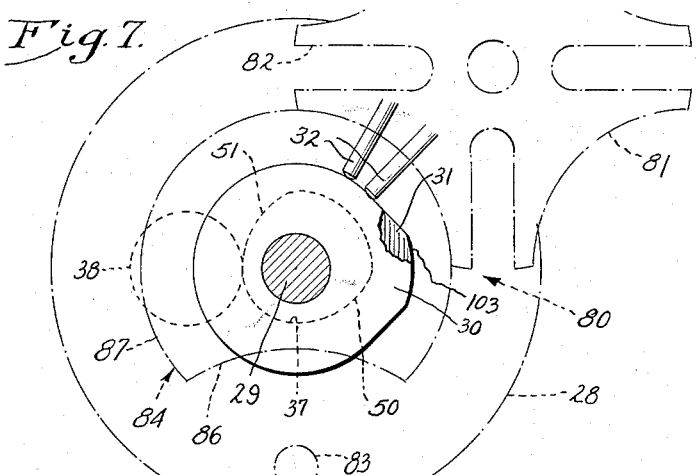
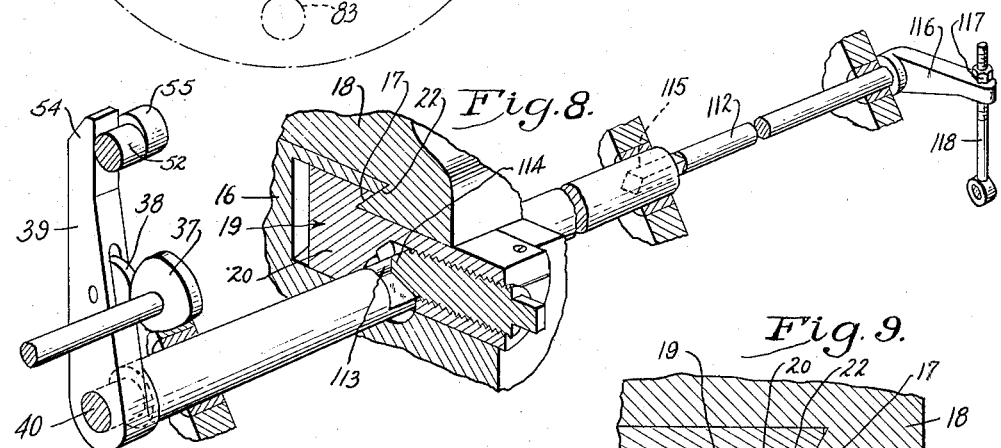
INVENTOR.
John P. Scone
BY
Carlson, Pilgner, Hubbard & Wolfe
ATTORNEYS

United States Patent Office 2,714,838
Patented Aug. 9, 1955

2,714,838

HOB SHIFTING MECHANISM

John P. Scone, Rockford, Ill., assignor to Barber-Colman Company, Rockford, Ill., a corporation of Illinois Application March 16, 1951, Serial No. 215,940

7 Claims. (Cl. 90—4)

This invention relates to a mechanism by which the hob in a hobbing machine may be shifted axially in very small and predetermined increments to bring new sections of the hob periphery successively into operative association with the work thus causing an even amount of wear on all of the hob teeth.

One object is to derive the hob shifting movement from a power actuator which also serves to release and apply the clamp by which the hob slide is held in its supporting guideway.

A more detailed object is to utilize a rotary motor in a novel manner to release and apply the clamp and to shift the hob slide in proper sequence.

The invention also resides in the novel and simple arrangement of the parts to achieve the desired sequence of operation.

Other objects and advantages of the invention will become apparent from the following detailed description taken in connection with the accompanying drawings, in which Figure 1 is a fragmentary frontal elevational view of a hobbing machine embodying the novel features of the present invention.

Fig. 5 is a schematic perspective view of the principal operating parts.

Figure 2:
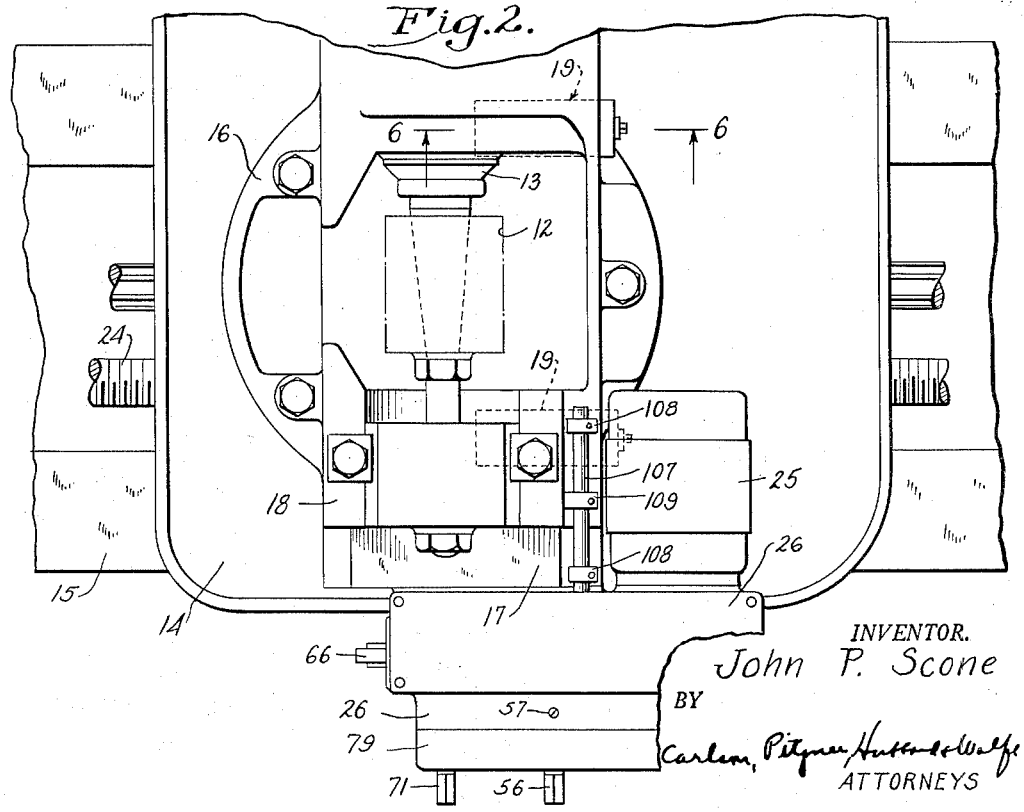
Fig. 2 is a fragmentary plan view.
Figure 3:
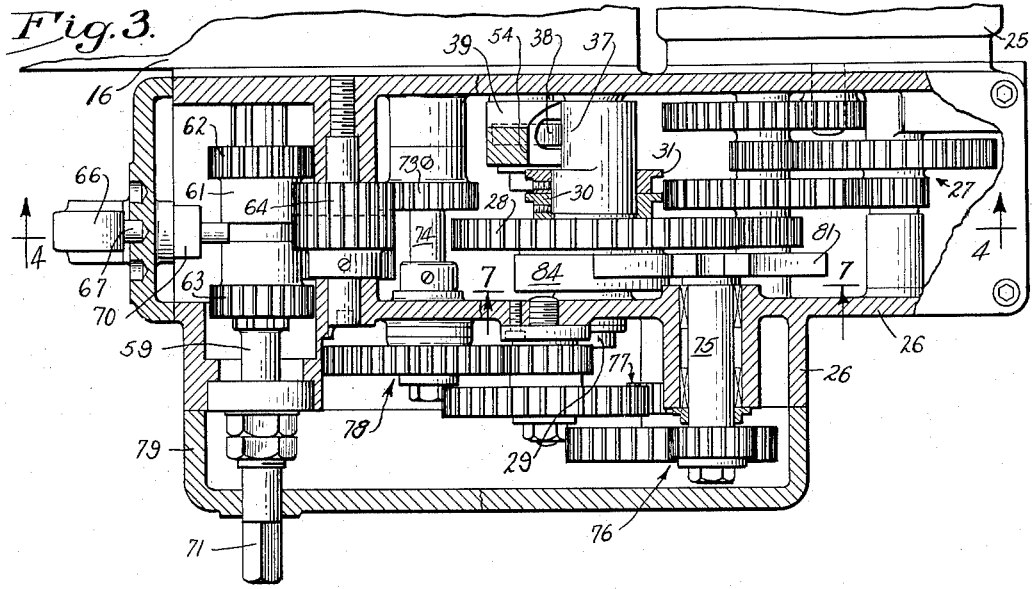
Fig. 3 is a fragmentary sectional view taken along the line 3—3 of Fig. 4.

Figs. 6 and 7 are fragmentary sectional views taken respectively along the lines 6—6 and 7—7 of Figs. 2 and 3.

Fig. 8 is a perspective view showing a modified form of actuator for the hob slide clamp.

Fig. 9 is a fragmentary sectional view similar to Fig. 6 but showing the modified form of clamp actuator.

Fig. 10 is a schematic view and wiring diagram.

In machines of this type, the work or gear blank W to be hobbed is secured to a horizontal spindle 10 supported on the vertically movable work slide 11 and power driven in synchronism with a hob 12 which is fast on a spindle 13. The latter is rotatably supported on a carriage 14 guided along bed ways 15 which parallel the work spindle 10. A swivel plate 16 is mounted on the slide 14 for angular adjustment about a vertical axis and is formed with diametrical guideways 17 adjustably supporting a slide 18 rotatably supporting the hob spindle 13.

During the hobbing operation, the slide 18 is locked securely in the ways 17 by clamps 19 spaced along the slide as shown in Fig. 2 and herein comprising a plunger 20 (Figs. 5 to 8) slidable in a bore 21 in one side of the swivel plate 16 and having an inclined surface 22 overlapping and engageable with a portion of one of the ways 17 on the hob slide 18 to frictionally grip the slideway. The clamping force is derived from a resilient member which, in the form shown in Figs. 5 and 6, comprises a heavy spring coil 23 acting in compression between the inner end of the plunger 20 and the bottom of the bore 21.

Figure 1:
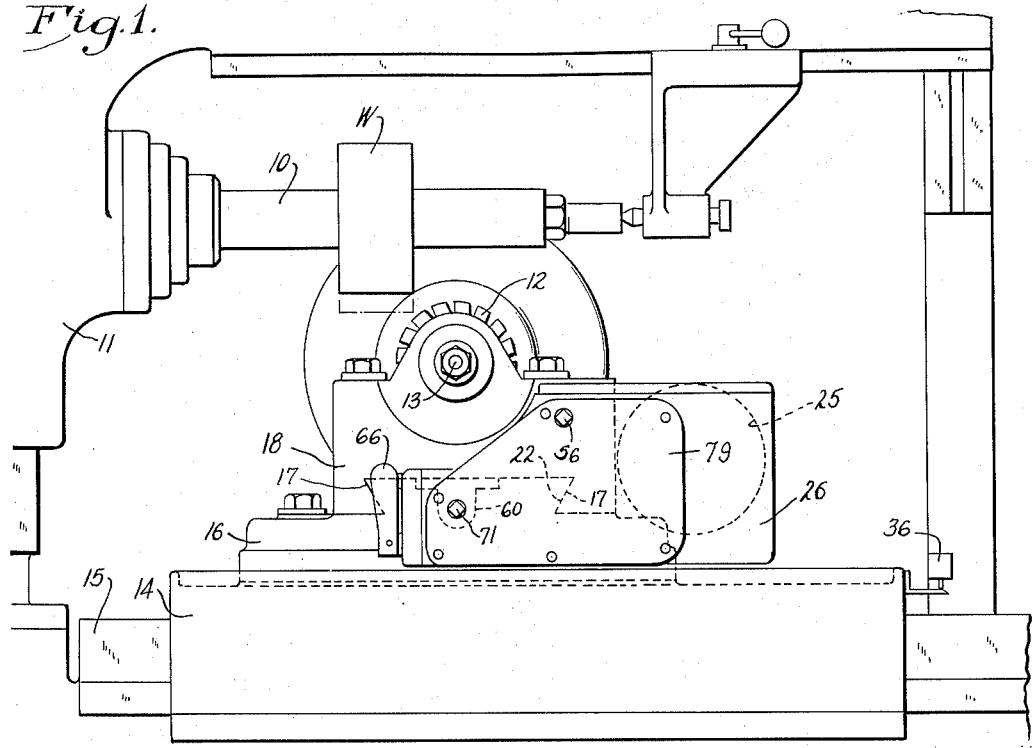

In the normal hobbing cycle, the slide 14 is advanced by a screw 24 (Fig. 2) to move the rotating hob across the rotating workpiece and then, after raising of the work slide 11, the slide is rapidly returned to the right as viewed in Fig. 1, preparatory to hobbing the next workpiece. The mechanism for effecting the various motions between the work and the hob to execute an automatic cycle is well known in the art.

Figure 4:
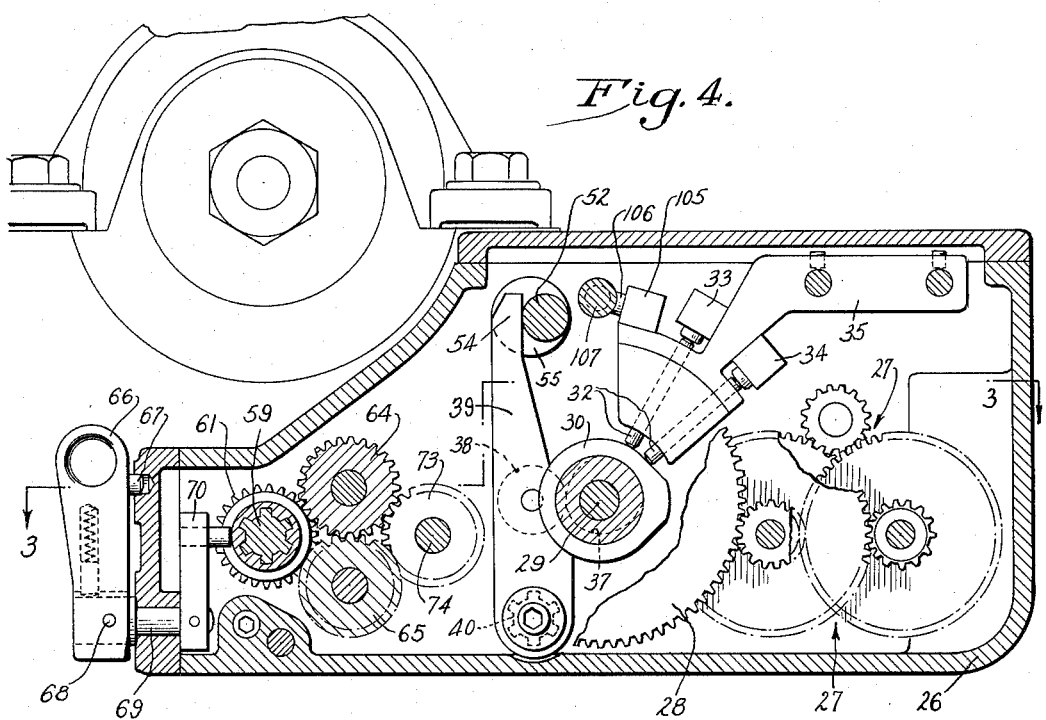
Fig. 4 is a fragmentary sectional view taken along the line 4—4 of Fig. 3.

To insure even and long wearing of the hob teeth, it is desirable, after the completion of each cycle, to advance the hob slide 18 along the ways 17 through an extremely short but accurately controlled increment, for example .003 of an inch. In accordance with the present invention, such step by step shifting of the hob is effected by a novel motor driven mechanism which also operates to release the clamps 19 prior to the hob shift and thereafter to reapply the clamps. These three functions are executed in the proper sequence in each successive cycle of operation of a rotary motor 25 mounted on the swivel plate 16 and operating through speed reduction gearing 27 terminating in a gear 28 fast on a shaft 29 paralleling the hob spindle. This shaft and the reduction gears are disposed in and journaled on a small housing 26 (Figs. 1 and 2) secured to the outer end of the swivel plate 16 on which the motor 25 is also supported. Cams 30 and 31 fast on the shaft 29 act on follower pins 32 to actuate switches 33 and 34 which are mounted on a bracket 35 in the housing. The switch 33 cooperates with a switch 36 (Fig. 1) to control the starting of the motor 25 and operation of the latter to turn the shaft 29 through a predetermined distance, one revolution clockwise in this instance from a normal stopped position as shown in Figs. 4, 5, and 7. The switch 36 is mounted on the bed of the hobbing machine and is normally closed but opened whenever the carriage 14 is in its fully retracted or starting position as shown in Fig. 1. After part of the revolution, the cam 30 opens the switch 33 after the cam 31 has closed the switch 34 so that the operation of the motor is continued for the remainder of the shaft revolution whereupon the switch 33 is closed and the switch 34 is opened to stop the motor.

In the first half of the camshaft revolution, the clamps 19 are released by the action of a cam 37 (Figs. 5 and 7) fast on the shaft and acting on a follower roller 38. The latter is on an arm 39 fast on a rockshaft 40 to which are secured two arms 41 whose free ends 42 project into recesses 43 in the undersides of extensions 44 of the clamping plungers 20. The extensions underlie the way 17 and project outwardly beyond the edge of the slide 18 where their ends are exposed. A nut 45 seated against an abutment 46 in the outer end of the extension 44 is threaded onto a rod 47 slidable in a bore 48 and having a downwardly opening notch receiving the free arm end 42. The latter bears against an abutment 49 on the rod which, along with the clamping plunger 20, may be moved inwardly by counterclockwise rocking of the arms 39 and 41 as the rise 50 of the cam 37 passes the roller. This compresses the springs 23 and releases the clamps 19. In the final quarter part of the camshaft revolution, a fall 51 on the cam is presented to the follower 38 allowing the arms 41 to swing clockwise. The springs 23 then act to reapply the clamps and lock the hob slide in its ways 17. The point in the camshaft movement at which the clamps 17 are released may be varied by adjustment of the nuts 45 thus correspondingly shifting the abutments 49 relative to the clamping plungers 20.

Provision is also made for releasing the clamps manually when it is desired to adjust the position of the hob slide independently. This is accomplished by an eccentric cam 52 (Figs. 4, 5, and 8) acting on the extended or free end 54 of the follower arm 39. This cam is on a shaft 55 journaled in the housing 26 on the swivel plate 16 and having an exposed end 56 to which a wrench may be applied to turn the shaft after loosening of a set screw 57.

In each revolution of the shaft 29 and after release of the clamps 19, the shaft is coupled to a mechanism for shifting the hob slide 18 through the desired small increment and thereby render a new section of the hob operative. Herein, the shifting mechanism comprises a screw 58 formed on a shaft 59 and threading into a nut 60 on the underside of the hob slide 18. The shaft 59 projects through and is journaled in the housing 26 and is spline coupled to a collar 61 carrying gears 62 and 63 which may be meshed selectively with two intermeshed gears 64 and 65 or alternatively may be disengaged from both of these gears. By swinging an externally exposed arm 66, the collar may be shifted axially selectively to forward or backward shift positions through an intermediate neutral position (Fig. 3) in which the collar is held by a suitable releasable detent 67. Herein, the arm 66 is fulcrumed at 68 on a shaft 69 journaled in a wall of the housing 26 and carrying an arm 70 having a projection riding in a groove in the collar. When the collar 61 is in the neutral position, the shaft 59 may be turned by a suitable tool applied to the outer shaft end 71. In this way, the screw mechanism may be actuated to adjust the position of the hob slide independently of the automatic shifting mechanism.

The gear 64 meshes with a gear 73 fast on a shaft 74 and driven from a shaft 75 through two sets of speed reduction pick off gears 76 and 77 and a third set 78 of reduction gears. The pick off gears which may be exposed after removal of a cover 79 (Fig. 1) may be changed to vary the ratio of motion transmission between the shafts 75 and 74 and therefore the amount of axial shift of the hob for one revolution of the shaft 29.

While the shafts 29 and 75 may be coupled together in various ways during the intermediate portion of each revolution of the shaft 29, it is achieved in the present instance through intermittently acting gearing such as a Geneva stop mechanism 80 having a driven wheel 81 fast on the shaft 75 and formed with notches 82 adapted to receive a pin 83 on the gear 28. Secured to the latter is a disk 84 whose arcuate periphery 87 fits into one of the complemental recesses 85 in the periphery of the wheel 81 thus holding the latter against turning until a vacant sector 86 of the disk is presented to one projection of the star wheel 81. This sector is spaced inwardly from the drive pin 83 which enters one of the notches 82 before the wheel is freed and then turns the wheel through a quarter revolution before the locking surface 87 enters the next recess 85 of the wheel. As a result, the shaft 75 is advanced step by step in quarter revolutions during the intermediate part of each revolution of the cam shaft 29 and is locked against turning during the remaining parts of the revolution.

When a new or resharpened hob is mounted in the hobbing machine, the operator will first manually set the slide 18 so that the proper end of the hob will be adapted for cutting engagement with the work blank. Then, the collar 61 is shifted to bring one of the gears 62, 63 into mesh with the gear 64 or the gear 65 respectively for producing the direction of intermittent shift of the hob. After removal of the finished gear following each hobbing cycle of the machine, the operator depresses a push button 89 (Fig. 10) closing a switch 90 which completes a circuit through the then closed switch 36 to energize a relay 91 which is locked in by closure of its switch 92 which is interposed between the switch 36 and the power line 93. Closure of the switch 94 of the relay energizes the motor 95 by which the screw 24 is driven to rapidly return the hobbing machine carriage 14 to starting position.

Depression of the push button 89 also closes a switch 96 completing an energizing circuit for a relay 97 extending from the line 93 through the then closed switch 33 and the switch 96. The relay energization is held by closure of its switch 98. A second switch 99 of the relay 97 is in a circuit which extends from the line 93 through the switch 99, a switch 100 which is closed when the relay 91 is deenergized and will energize the coil of a relay 101 whose switch 102 controls the energization of the hob shifting motor 25. Thus the latter is started by closure of the switch 100 when the relay 91 is deenergized by opening of the switch 36 at the end of the rapid return of the hob carriage 14.

A cycle of hob shifting mechanism is thus initiated. In the first half revolution of the shaft 29, the cam 37 retracts the plungers 20 against the action of the springs 23 thus releasing the clamps 19. About this time, the drive pin 83 of the Geneva mechanism 80 enters a notch 82 in the star wheel 81 thus coupling the latter to the shaft 29. In the ensuing quarter revolution of the shaft, the wheel and its shaft 75 turn with the shaft 29 and through the speed reduction gearing 76, 77, 78, the screw shaft 59 is turned through a small fraction of a revolution thus advancing the slide 18 and the hob thereon axially through the desired small increment. This advance terminates as the drive pin 83 leaves the star wheel notch 82 and the wheel again becomes locked by the disk 84 for the remainder of the revolution of the shaft 29.

After about three quarters of the revolution of the shaft 29, a lobe 103 (Fig. 7) on the cam 31 becomes effective to close the switch 34 and slightly thereafter the cam 30 opens the switch 33. Opening of the switch 33 interrupts the holding circuit for the relay 97 whose switch 99 is thus opened. The control of the circuit for the relay 101 is thus transferred from the switch 99 to the switch 34 so that the motor 25 continues to operate.

In the final quarter of the revolution of the shaft 29, the face 51 of the cam 37 is presented to the follower 38 thus allowing the clamping plungers to be moved by their springs 23 against the slide thus locking the latter in its ways 17. Finally, at the end of the revolution of the shaft 29, the condition of the switches 33 and 34 is reversed by their cams 30 and 31 thus breaking the maintaining circuit for the relay 101 so as to stop the motor 25 and interrupt the motion of the shaft 29. The switch 33 is left closed so that the circuits are conditioned for restarting another carriage return and hob shifting cycle in response to depression of the button 89 after hobbing of the next work blank. The shaft 29 thus turns unidirectionally and through successive steps in response to repeated depressions of the button 89, each step comprising one revolution of the shaft.

Provision is made for disabling the entire hobbing machine when the full length of the hob has been presented to the work. This includes a switch 105 (Figs. 4 and 5) included in the starting circuit of the hobbing machine and responsive to the movement of the hob slide 18. Herein, the switch is mounted on the bracket 35 on the swivel plate 16 with its actuating pin 106 engageable with a rod 107 (Figs. 4 and 5) slidably supported on the swivel plate housing 26 alongside the hob slide 18 and carrying spaced collars 108 selectively adjustable along the rod and disposed on opposite sides of a lug 109 projecting from the hob slide 18. During normal operation of the hobbing machine, the actuating pin 106 of the switch 105 projects into a groove 111 in the rod 107 and the switch is conditioned to permit operation of the machine. The lug 109 moves with the hob slide 18 in the successive shifting movements and, after the full length of the hob has been presented to the work, the lug encounters one of the collars 108 and shifts the rod 107 endwise thus camming the pin 106 out of the groove 111. The switch 105 is thus actuated to disable the hobbing machine. The collar 108 is of course adjusted along the rod according to the length of the hob being used.

In the modified construction shown in Figs. 8 and 9, the force for actuating the clamps 19 is derived from the torsional stress in a bar 112 of resilient material and applied through the rockshaft 40 by arms 113 bearing against abutments 114 on the clamping plungers 20. The end of the rockshaft remote from the actuating cam 37 is coupled through a square key connection 115 to one end of the torsion bar 112 which is supported on the swivel plate 16 and adjustably anchored to the plate at its other end. Herein the anchor comprises an arm 116 fast on the bar and bearing at its free end against a nut 117 on a screw 118 pivoted on the swivel plate 16. By adjusting the nut, the torsional stress in the bar and therefore the clamping force applied to the plungers 20 by clockwise turning of the rockshaft 40 may be varied as desired. The cam 37 acts as described above to twist the free end of the bar 112 reversely and thus overcome the torsion thereby releasing the clamps.

I claim as my invention:

1. The combination of, a hobbing machine having a slide adapted to support a rotary hob, a member supporting said slide for movement parallel to the hob axis, a clamping element mounted on said member and engageable with said slide, means resiliently urging said element against the slide, a rotary shaft, a motor for driving said shaft, means responsive to the movement of said shaft and controlling the operation of said motor to interrupt the operation thereof after turning of the shaft through a predetermined range, a cam actuated by said shaft and operable in the initial portion of said range to retract said element from said slide and in the final part of the range to release the element for movement to clamping position, mechanism for converting the successive rotary motions of said shaft into rectilinear movements of said slide whereby to advance the latter step by step, and means operable during turning of said shaft through the intermediate portion of said range while said clamping element is retracted to couple said shaft to said mechanism.

2. The combination of, a hobbing machine having a carriage which is advanced and retracted in each hobbing cycle and a slide adapted to support a rotary hob and shiftable relative to said carriage along the hob axis, a rotary shaft, a motor for turning the shaft, means responsive to the final return of said carriage after each hobbing operation to start said motor and maintain operation thereof until said shaft has been turned through a predetermined range, a clamp for locking said slide against shifting, means operated by said shaft during the initial and final parts of said range to release and reapply said clamp, speed reducing means, and a coupling operable during the intermediate portion of said range to transmit the motion of said shaft through said speed reducing means to said slide whereby to shift the slide and bring a new part of the hob into operative position.

3. The combination of, a hobbing machine having a slide adapted to support a rotary hob, a member supporting said slide for movement along the hob axis, an element mounted on said member for engagement with said slide to clamp the latter against movement, a rockshaft on said member movable in opposite directions to cause movement of said element into and out of clamping position, an elongated bar coupled to said rockshaft and torsionally stressed to urge said element toward clamping position, a power actuator having a driven member and adapted when started to move said driven member through a predetermined range, means actuated by said driven member to turn said rockshaft against the torsion of said bar and release said clamping element, and mechanism operated by said driven element while said clamping element is released to advance said slide and thereby shift said hob axially.

4. The combination of, a hobbing machine having a slide adapted to support a rotary hob, a member supporting said slide for movement parallel to the hob axis, a clamp for locking said slide in said member, a rotary shaft, a motor for driving said shaft, means responsive to the movement of said shaft and controlling the operation of said motor to interrupt the operation thereof after turning of the shaft through a predetermined range, means actuated by said shaft and operable in the initial and final portions of said range to respectively release and apply said clamp, gearing intermittently operable to convert the rotary motion of said shaft into step by step rectilinear movement of said slide, and means operable during turning of said shaft through the intermediate portion of said range to render said gearing operative whereby to cause shifting of said slide while said clamp is released.

5. The combination of, a hobbing machine having a slide adapted to support a rotary hob, a member supporting said slide for movement parallel to the hob axis, a clamp for locking said slide in said member, a rotary shaft, a motor for driving said shaft, means responsive to the movement of said shaft and controlling the operation of said motor to interrupt the operation thereof after turning of the shaft through a predetermined range, means operable in the initial and final portions of said range to transmit the motion of said shaft to said clamp and respectively release and apply the clamp, mechanism for converting the rotary motion of said shaft into rectilinear movement of said slide, and means operable during turning of said shaft through the intermediate portion of said range to couple said shaft to said mechanism whereby to cause shifting of said slide while said clamp is released.

6. The combination of, a hobbing machine having a slide adapted to support a rotary hob, a member supporting said slide for movement parallel to the hob axis, a clamp for locking said slide in said member, a rotary shaft, a motor for driving said shaft, means responsive to the movement of said shaft and controlling the operation of said motor to interrupt the operation thereof after turning of the shaft through a predetermined range, means responsive to the motion of said shaft and operable in the initial and final portions of said range to respectively release and apply said clamp, mechanism for converting the rotary motion of said shaft into rectilinear movement of said slide, and means operable during turning of said shaft through the intermediate portion of said range to couple said shaft to said mechanism whereby to cause shifting of said slide while said clamp is released.

7. In a hobbing machine, the combination of a slide adapted to support a rotary hob, means supporting said slide for movement parallel to the hob axis, a clamp for locking said slide in said supporting means, a rotary shaft, a motor for driving said shaft, means responsive to the movement of said shaft and controlling said motor to interrupt the operation thereof after turning the shaft through a predetermined range, means actuated by movement of said shaft and operable in the initial and final portions of said range to respectively release and apply said clamp, mechanism for converting the rotary motion of said shaft into rectilinear movement of said slide, and coupling means including a Geneva mechanism operable during turning of said shaft through the intermediate portion of said range to transmit the motion of said shaft to said converting mechanism whereby to cause shifting of said slide while said clamp is released.

References Cited in the file of this patent

UNITED STATES PATENTS

| 2,019,509 | Schauer et al. | Nov. 5, 1935 |
| 2,123,825 | De Vlieg | July 12, 1938 |
| 2,483,810 | Cotta | Oct. 4, 1949 |
| 2,615,372 | Coffin | Oct. 28, 1952 |